Nov. 13, 1923.
W. KRAUSE
PIPE JOINT
Filed May 20, 1920
1,474,155
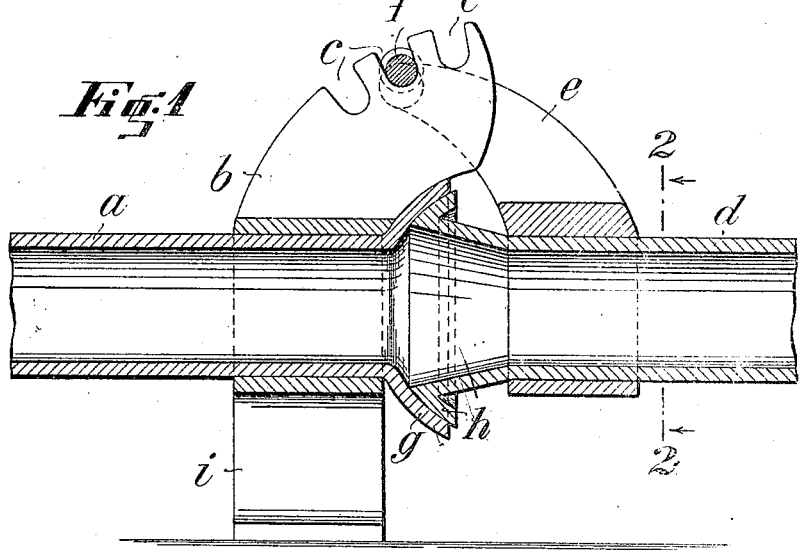
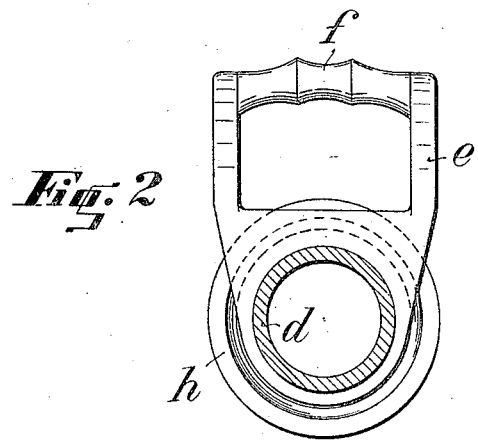
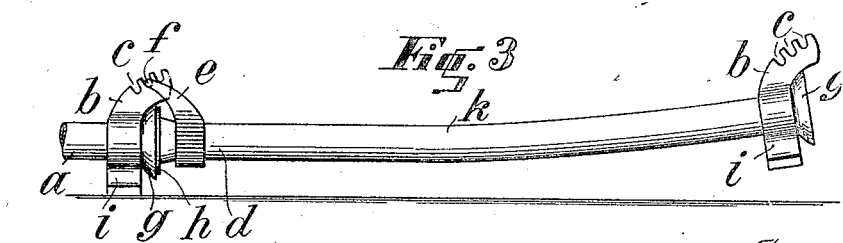
Witnesses:
Daniel Mathé
Luler A Pohlmann
Inventor
Walter Krause
by John Lotka
Attorney Patented Nov. 13, 1923.

1,474,155

UNITED STATES PATENT OFFICE.

WALTER KRAUSE, OF FRIESACK, GERMANY.

PIPE JOINT.

Application filed May 20, 1920. Serial No. 383,017.

(GRANTED UNDER THE PROVISIONS OF THE ACT OF MARCH 3, 1921, 41 STAT. L., 1313.)

*To all whom it may concern:*

Be it known that I, WALTER KRAUSE, a citizen of Germany, and resident of Friesack (Mark), Germany, have invented certain new and useful Improvements in Pipe Joints (for which applications have been filed in Germany, May 12, 1916, Patent No. 335,852; Austria, January 29, 1919, Patent No. 84,577; Hungary, February 1, 1919, Patent No. 79,049; France, February 11, 1919, Patent No. 517,858; Spain, February 19, 1919, Patent No. 69,098; Denmark, February 3, 1919, Patent No. 26,760; Belgium, February 13, 1919, Patent No. 278,971; Netherlands, February 11, 1919, Patent No. 6,125; Italy, February 25, 1919, Patent No. 96/542; Luxemburg, October 29, 1919, Patent No. 11,539; Rumania, April 16, 1920, Patent No. 5,072; Sweden, January 31, 1919, Patent No. 48,238; Great Britain, January 26, 1920, Patent No. 138,338; Finland, October 27, 1919, Patent No. 8,064; Canada, May 26, 1920, Patent No. 221,576; Poland, July 5, 1920, no patent issued as yet; Czechoslovakia, June 17, 1920, Patent No. 7,837; Argentine Republic, August 3, 1920, Patent No. 17,666; Union of South Africa, December 17, 1920, Patent No. 1382/20; Southwest Africa, April 20, 1921, no patent issued as yet), of which the following is a specification.

My invention relates to improvements in pipe joints. And the object of the improvements is to provide a pipe joint in which the pipes are connected in a tight manner by gravity and without any locking members such as screws, cams, or the like. With this object in view my invention consists in providing a support for one of the pipes to be joined and means on said pipe for suspending therefrom the other pipe in such a way, that the ends of the pipes are in contact with each other and are pressed in tight engagement with each other by the gravity of the suspended pipe. It will readily be understood, that by thus constructing the pipe joint the pipes are readily connected or disconnected, because the joint is made by merely suspending one pipe from the other one. Therefore my improved joint is particularly useful in such cases in which considerable lengths of pipes must frequently and speedily be connected or disconnected, as is the case for example in irrigation systems.

For the purpose of explaining the invention an example embodying the same has been shown in the accompanying drawing, in which the same letters of reference have been used in all the views to indicate corresponding parts. In said drawing, Fig. 1, is a longitudinal section of the joint, Fig. 2, is a vertical cross-section taken on the line 2—2 of Fig. 1, and Fig. 3, is a side view illustrating by way of example a preferred manner in which the joint is used for connecting several pipes with one another.

Referring now to the example illustrated in the figures, one of the pipes $a$ is provided at one end with an arm $b$ formed at its upper end with three notches $c$. The other pipe $d$ is provided with a bail $e$ which is adapted to engage with its transverse portion in either one of the notches $c$ of the arm $b$. In the preferred form shown in the figures the bail $e$ consists of two upright arms which are connected at their upper ends by a transverse bar, and the said transverse bar is formed with three bearing portions $f$ each of which is adapted to engage in either one of the notches $c$. The pipes are preferably made with outwardly flaring ends and they are formed with flanges $g$ and $h$ respectively having spherical contacting faces, and the diameters of the flanges are such that a tight joint is produced in any angular position at which the pipe $d$ can be set by reason of the notches $c$ and the bearing portions $f$. Preferably the notches $c$ are disposed on an arc which is concentric to the spherical bearing faces of the flanges $g$ and $h$. By reason of the said notches and the bearing portions $f$ the pipe $d$ can be disposed vertically and laterally at such angles as might be necessary according to the lateral or vertical displacements of the pipes to be joined. While in my opinion this construction is preferable by reason of its simplicity and rigidity, I wish it to be understood, that my invention is not limited to the said construction and that the same result may be attained by other means, for example by providing an arm $b$ and a bail $e$ which are adjustable relatively to the pipes $a$ and $d$ respectively. In the example shown in the figures the pipe $a$ on which the pipe $d$ is supported is provided with a foot $i$ by means of which the pipe $a$ is supported on the ground and which is constructed in such a way as to prevent the pipe from tilting.

From the foregoing it will readily be understood that after suspending the pipe $d$ with its bail $e$ from the arm $b$, the contacting faces of the flanges $g$ and $h$ are pressed against each other by the weight of the pipe $d$, whereby a tight joint is produced without any locking or clamping means or packing.

In Fig. 3 I have shown a length of tubing in which the pipe $k$ when carrying no load is slightly inclined upwards, the figure showing the inclination in an exaggerated degree. Therefore, after all the pipes have been connected the joint at the left hand end of the pipe $k$ is pressed together not only by the weight of the pipe $k$, but in addition by the weight of the succeeding pipe which is to be connected to the right hand end of the pipe $k$, and which causes a greater pressure by reason of the greater leverage.

While in describing the invention reference has been made to an embodiment thereof which in my opinion serves its purpose best, I wish it to be understood, that my invention is not limited to the example shown in the figures, and that various changes may be made in the general arrangement of the joint and in the construction of its parts.

I claim:

1. In a pipe joint, the combination, with the pipes to be connected having contacting faces, of a supporting arm extending upwardly from one of said pipes, a foot extending downwardly from the same pipe, and a suspension arm by which the other of said pipes is hung on said supporting arm to cause such other pipe to be pressed by gravity against the first-named pipe.

2. In a pipe joint, the combination, with the pipes to be connected having contacting faces, of a supporting arm of open-notch formation on one of said pipes, and a suspension arm secured to the other pipe and having a transverse fulcrum member movable with such other pipe and engaging the notched portion of said supporting arm, whereby the pipe having the suspension arm may be readily connected with the other pipe, or disconnected therefrom, without disconnecting the fulcrum member from the pipe carrying it.

3. In a pipe joint, the combination, with the pipes to be connected having contacting faces, of a supporting arm on one of said pipes, and a suspension arm by which the other of said pipes is hung on said supporting arm to cause such other pipe to be pressed by gravity against the first-named pipe, one of said arms having an open-notch formation, and the other arm having a fulcrum member which is of a thickness smaller than the width of the open-end notch of the first-named arm, and adapted to engage the notched portion of the first-named arm, whereby the pipe having the suspension arm may be readily hooked on or off the pipe having the supporting arm, without disconnecting the fulcrum member from the arm carrying it.

4. In a pipe joint, the combination, with the pipes to be connected having contacting faces, of a supporting arm on one of said pipes, and a suspension arm by which the other of said pipes is hung on said supporting arm to cause such other pipe to be pressed by gravity against the first-named pipe, one of said arms having a plurality of notches, and the other arm engaging said first-named arm at one of its notches.

5. In a pipe joint, the combination, with the pipes to be connected having contacting faces, of a notched arm on one of said pipes, and an arm on the other one of said pipes having a plurality of bearing portions located transversely one beside the other and arranged for engagement with said notched arm.

6. In a pipe joint, the combination, with the pipes to be connected having contacting faces, of supporting means for one of said pipes disposed in such a way that by gravity an axial pressure is exerted by the pipe provided with the supporting means whereby the contacting faces are forced together, said supporting means being adapted to connect said pipes in different angular positions.

7. In a pipe joint, the combination, with the pipes to be connected having contacting faces, of supporting means for one of said pipes disposed in such a way that by gravity an axial pressure is exerted by the pipe provided with supporting means by which the contacting faces are forced together, said supporting means being disposed in such a way, that the pipe supported thereby is inclined upwards and away from the joint.

8. In a pipe joint, the combination, with the pipes to be connected having spherical contacting faces, of an arm on one of said pipes having a plurality of notches disposed concentrically of said spherical contacting faces, and an arm on the other one of said pipes engaging in one of said notches.

9. In a pipe joint, the combination, with the pipes to be connected having contacting faces, of a supporting arm of open-notch formation on one of said pipes, a foot extending down from the same pipe, and a suspension arm secured to the other pipe and having a fulcrum member movable with said other pipe and movable into and out of the open end of the notch in the notched portion of said supporting arm, whereby the pipe having the suspension arm may be readily connected with the other pipe, or disconnected therefrom, without disconnecting the fulcrum member from the pipe carrying it.

In testimony whereof I hereunto affix my signature.

WALTER KRAUSE.